(12) United States Patent
Jiang et al.

(10) Patent No.: US 9,152,836 B2
(45) Date of Patent: Oct. 6, 2015

(54) CODE SCANNING DEVICE AND CODE SCANNING METHOD USING THE SAME

(75) Inventors: Shendou Jiang, Shenzhen (CN); Chuanfen Xie, Shenzhen (CN); Xuezheng Wang, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 934 days.

(21) Appl. No.: 11/861,944

(22) Filed: Sep. 26, 2007

(65) Prior Publication Data

US 2008/0073435 A1 Mar. 27, 2008

(30) Foreign Application Priority Data

Sep. 27, 2006 (CN) .......................... 2006 1 0062870

(51) Int. Cl.
*G06K 7/14* (2006.01)
*G06K 7/10* (2006.01)

(52) U.S. Cl.
CPC .......... *G06K 7/1465* (2013.01); *G06K 7/10851* (2013.01); *G06K 7/10861* (2013.01)

(58) Field of Classification Search
None
See application file for complete search history.

(56) References Cited

U.S. PATENT DOCUMENTS

| | | | | |
|---|---|---|---|---|
| 4,041,454 A | * | 8/1977 | Shepard et al. | 382/322 |
| 4,082,943 A | * | 4/1978 | Jensen et al. | 714/2 |
| 4,676,343 A | * | 6/1987 | Humble et al. | 186/61 |
| 4,894,523 A | * | 1/1990 | Chadima et al. | 235/462.45 |
| 5,258,812 A | * | 11/1993 | Mahoney | 399/370 |
| 5,497,314 A | * | 3/1996 | Novak | 705/17 |
| 5,979,761 A | | 11/1999 | Wurz et al. | |
| 6,142,376 A | * | 11/2000 | Cherry et al. | 235/462.14 |
| 6,637,655 B1 | * | 10/2003 | Hudrick et al. | 235/462.14 |
| 6,962,291 B2 | | 11/2005 | Guntveit et al. | |
| 2001/0053002 A1 | * | 12/2001 | Kageyama et al. | 358/471 |
| 2005/0178840 A1 | * | 8/2005 | Chang et al. | 235/462.14 |
| 2007/0119930 A1 | * | 5/2007 | Jordan et al. | 235/385 |
| 2008/0011846 A1 | * | 1/2008 | Cato | 235/435 |

FOREIGN PATENT DOCUMENTS

| | | |
|---|---|---|
| CN | 2153828 | 1/1994 |
| CN | 1079833 | 12/1997 |

(Continued)

OTHER PUBLICATIONS

China patent application No. 200610062870.7, Search Report dated Aug. 8, 2007.

*Primary Examiner* — Michael G Lee
*Assistant Examiner* — David Tardif
(74) *Attorney, Agent, or Firm* — Kory D. Christensen; Stoel Rives LLP (57) ABSTRACT

The present invention discloses a code scanning device including a code scanner, a supporting member and a data processing and controlling unit. The unit is configured for receiving data information of a scanned code and determining whether or not the data information is correct. If correct, the unit stops scanning of the code scanner and controls the supporting member to move so that a next code is shifted to a scanning position. Wherein when the data information is incorrect or the unit fails to receive data information, the unit controls the code scanner to keep on scanning, and when scanning time exceeds a second predetermined time and the unit fails to receive correct data information, the unit stops scanning and controls the supporting member to move so that a next given code is shifted to the scanning position. The scanning device has an improved scanning speed and a high scanning reliability.

18 Claims, 8 Drawing Sheets

(56) References Cited

FOREIGN PATENT DOCUMENTS

| | | |
|---|---|---|
| CN | 2354186 | 12/1999 |
| CN | 2521674 | 11/2002 |
| JP | 09-231299 | 9/1997 |
| JP | 2000-99618 | 4/2000 |

* cited by examiner

(prior art)

FIG. 1

(prior art)

FIG. 2

(prior art)

CODE SCANNING DEVICE AND CODE SCANNING METHOD USING THE SAME

BACKGROUND OF THE INVENTION

1. Field of the Invention

The present invention relates to scanning devices and scanning methods, more particularly, to a code scanning device available for a biochemical analyzer and a code scanning method using the same.

2. Discussion of the Related Art

At present, code scanning devices are widely applied in various instruments, such as biochemical analyzers for scanning codes of specimens/reagents, and can automatically input information of specimens/reagents (e.g., bar codes). In typical biochemical analyzers or published patent documents, the code scanning devices mainly utilize one of three code scanning models as follows: a static scanning model, a dynamic scanning model, and a combination thereof.

A typical static scanning model includes the following steps. A specimen/reagent table of a biochemical analyzer is driven to rotate so that a given code to be tested moves to a scanning position. The given code having information of the specimen/reagent to be registered can be read out by a code scanner in the biochemical analyzer. A control unit of the biochemical analyzer transmits an action command to the code scanner. The code scanner scans the given code when the given code is still.

Figure 1:
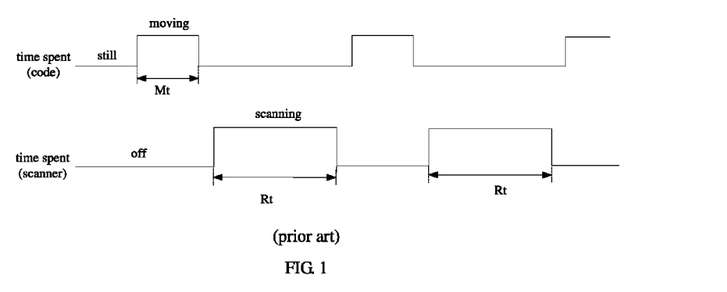
FIG. 1 is a time schedule graph of a conventional static scanning model during a constant scanning period.

FIG. 1 illustrates a time schedule graph of scanning the given code. A test-tube in a supporting member (i.e., the specimen/reagent table) takes moving time Mt to move from a waiting position to a scanning position. When the specimen/reagent table stops movement, i.e., the code is still, the control unit transmits an action command to the code scanner so that the code scanner works from an off state. When the code scanner scans the code for a certain period Rt, the control unit transmits a command of ending the scanning to the code scanner so as to stop scanning the given code, thereby completing this current scanning period. Then, the control unit controls the specimen/reagent table to rotate so that a next given code is shifted to the scanning position, thereby being ready for a next scanning process.

A typical dynamic scanning model includes the following steps. A specimen/reagent table is driven to rotate so that the given code to be tested moves to the scanning position. The control unit transmits an action command to the code scanner. The code scanner scans the given code when the given code is moving.

Figure 2:
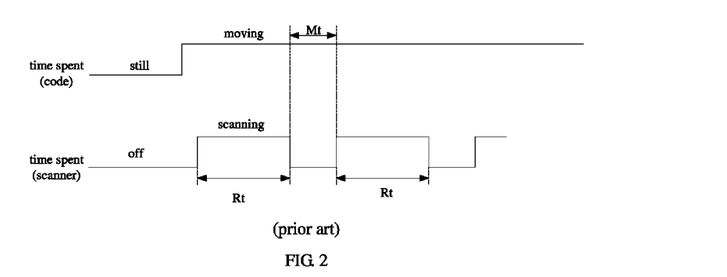
FIG. 2 is a time schedule graph of a conventional dynamic scanning model during a constant scanning period.

FIG. 2 illustrates a time schedule graph of scanning the given code using the dynamic scanning model. The test-tube in the supporting member (i.e., the specimen/reagent table) takes moving time Mt to move from the waiting position to the scanning position. The code scanner takes scanning time Rt to scan the code. When the code scanner scans the code for a certain time, the control unit transmits a command of ending the scanning to the code scanner so as to stop scanning the given code, thereby completing this current scanning period. Then, the control unit controls the specimen/reagent table to rotate so that a next given code is shifted to the scanning position, thereby being ready for a next scanning process.

A typical dynamic and static scanning combined model has properties of the static scanning model and the dynamic scanning model. The dynamic and static scanning combined model includes the following steps. The specimen/reagent table is driven to rotate so that the given code to be tested moves to the scanning position. When the code is moving, the code scanner scans the given code. When the specimen/reagent table arrives at the scanning position and then is still, i.e., the code is also still, the code scanner keeps on scanning the code for a certain time.

Figure 3:
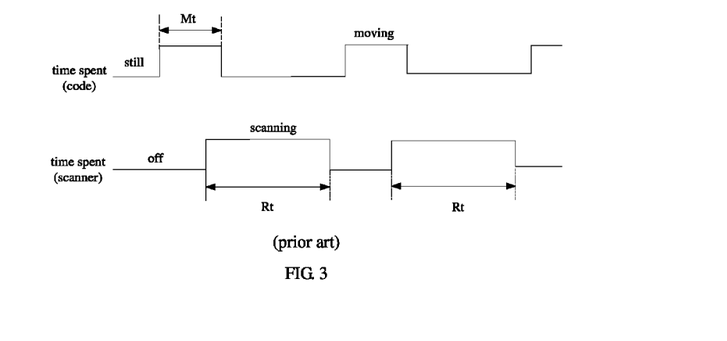
FIG. 3 is a time schedule graph of a conventional dynamic and static scanning combined model during a constant scanning period.

FIG. 3 illustrates a time schedule of scanning the given code using the dynamic and static scanning combined model. The test-tube in the supporting member (i.e., the specimen/reagent table) takes the moving time Mt to move from the waiting position to the scanning position. The code scanner takes the scanning time Rt for scanning the code. The code scanner scans the given code when the given code is moving. The control unit transmits an action command to the code scanner before the code is still, i.e., during the moving of the code. Thereby, the code scanner begins to scan the code. When the code is still, the code scanner keeps on scanning the code for a certain time. After the code scanner scans the code for total scanning time Rt, the control unit transmits a command of ending the scanning to the code scanner so as to stop scanning the code, thereby completing this current scanning period. Then, the control unit controls the specimen/reagent table to rotate so that a next given code is shifted to the scanning position, thereby being ready for a next scanning process.

In the three methods, the scanning period is constant. That is, the scanning time in each scanning process is constant. Generally, the scanning period is defined to be relatively longer, in order to ensure that the code scanner has stable scanning performance. However, when the code scanner successfully scans the code and transmits data information of the code to the control unit and the control unit determines that the data information is correct, the code scanner still keeps on scanning the code until the constant scanning period is over. Thus, the scanning time is unduly increased, the speed of inputting information into the biochemical analyzer is lowered, and the service life of the code scanner is reduced.

SUMMARY OF THE INVENTION

An objective of the present invention is to provide a code scanning device that has stable scanning performance and a high scanning speed.

Another objective of the present invention is to provide a code scanning method using the code scanning device.

In accordance with a preferred embodiment of the present invention, a code scanning device is provided for realizing the above first objective. The code scanning device includes a code scanner configured for scanning a given code; a supporting member configured for supporting a carrier having the code to be scanned; and a data processing and controlling unit configured for receiving data information of the code transmitted from the code scanner and determining whether or not the data information of the code is correct, wherein when the data information is correct, the data processing and controlling unit controls the code scanner to stop scanning and the supporting member to move so that a next carrier with a next given code is shifted to the scanning position where the code scanner scans the next given code; and when the data information is incorrect or the data processing and controlling unit fails to receive data information of the scanned code, the data processing and controlling unit controls the code scanner to keep on scanning the code, and when scanning time of the code scanner exceeds a second predetermined time and the data processing and controlling unit still fails to receive correct data information transmitted from the code scanner, the data processing and controlling unit controls the code scanner to stop scanning the code and controls the supporting member to move so that the next carrier with the next given code is shifted to the scanning position.

Preferably, the data processing and controlling unit is further configured for controlling the code scanner to scan the code when the code is moving, and the supporting member to stop moving when scanning time of the code scanner exceeds a first predetermined time and the data processing and controlling unit fails to receive correct data information transmitted from the code scanner, thereby the code scanner scans the still codes, wherein the first predetermined time is shorter than the second predetermined time.

Preferably, when the code scanner fails to read out data information of the code during the scanning time longer than the second predetermined time, the code scanner transmits a failure signal to the data processing and controlling unit.

Preferably, when the code scanner scans the code for the scanning time longer than the second predetermined time and the data processing and controlling unit fails to receive data information of the code or the failure signal, the data processing and controlling unit stops scanning of the code scanner and movement of the supporting member.

Alternatively, the code scanner scans the code when the code is still.

Alternatively, the code scanner scans the code when the code is moving.

In accordance with another preferred embodiment of the present invention, a code scanning method is provided for realizing the above second objective. The code scanning method includes the following steps:

A1) controlling a code scanner to scan a code which is driven to a scanning position via a data processing and controlling unit;

B1) transmitting data information of the scanned code to the data processing and controlling unit when the code scanner completes scanning operation;

C1) determining whether or not the data information is correct via the data processing and controlling unit, if correct, the step D1 is followed; if not or without reception of data information, the step E1 is followed;

D1) stopping scanning of the code scanner and controlling the supporting member to move via the data processing and controlling unit, such that a next code to be scanned is shifted to the scanning position;

E1) controlling the code scanner to keep on scanning the current code via the data processing and controlling unit; and F1) stopping scanning of the code scanner and controlling the supporting member to move via the data processing and controlling unit such that a next code to be scanned is shifted to the scanning position when the code scanner scans the code for the scanning time longer than a second predetermined time and the data processing and controlling unit fails to receive correct data information of the code transmitted from the code scanner.

Preferably, the method further comprises the following step: transmitting a failure signal to the data processing and controlling unit when the code scanner fails to read out data information of the code during the scanning time longer than the second predetermined time.

Preferably, the method further comprises the following step: stopping scanning of the code scanner and movement of the supporting member when the code scanner scans the code for the scanning time longer than the second predetermined time and the data processing and controlling unit fails to receive data information of the code or the failure signal.

Alternatively, in step A1, the code scanner scans the code when the code is still.

Alternatively, in step A1, the code scanner scans the code when the code is moving.

Preferably, the method further comprises the following step between steps E1 and F1: stopping movement of the supporting member so that the code scanner scans the still code on the supporting member when the scanning time of the code scanner exceeds a first predetermined time and the data processing and controlling unit fails to receive correct data information transmitted from the code scanner, the first predetermined time being shorter than the second predetermined time.

In accordance with yet another preferred embodiment of the present invention, a code scanning device includes a code scanner configured for scanning a given code; a supporting member configured for supporting a carrier having the code to be scanned; and a data processing and controlling unit configured for receiving data information of the code transmitted from the code scanner and determining whether or not the data information of the codes is correct, wherein when the data information is correct, the data processing and controlling unit controls the code scanner to stop scanning the code and controls the code scanner to move to a next position corresponding to a next carrier with a next give code so that the code scanner can scan the next given code; and when the data information is incorrect or the data processing and controlling unit fails to receive data information of the scanned code, the data processing and controlling unit controls the code scanner to keep on scanning the code; and when the scanning time of the code scanner exceeds a second predetermined time and the data processing and controlling unit fails to receive correct data information transmitted from the code scanner, the data processing and controlling unit controls the code scanner to stop scanning the code and controls the code scanner to move so that the code scanner scans a next given code.

Preferably, the data processing and controlling unit is further configured for controlling the code scanner to scan the code when the code scanner is moving relative to the code to be scanned, and stopping the movement of the code scanner so that the code scanner statically scans the code when the scanning time of the code scanner exceeds a first predetermined time and the data processing and controlling unit fails to receive correct data information transmitted from the code scanner, the first predetermined time being shorter than the second predetermined time.

Preferably, when the code scanner fails to read out data information of the code during the scanning time longer than the second predetermined time, the scanner code transmits a failure signal to the data processing and controlling unit.

Preferably, when the code scanner scans the code for the scanning time longer than the second predetermined time and the data processing and controlling unit fails to receive data information of the code or the failure signal, the data processing and controlling unit stops scanning and movement of the code scanner.

Alternatively, the code scanner scans the code when the code scanner is still relative to the scanned code.

Alternatively, the code scanner scans the code when the code scanner is moving relative to the scanned code.

The present code scanning device and the code scanning method employ a dynamic period during scanning of the code scanner. The code scanner scans different codes for different scanning time. The data processing and controlling unit can simultaneously control the code scanner and the supporting member. When the code scanner reads out data information from the code, the data processing and controlling unit stops scanning of the code scanner and moves the supporting member or the code scanner. Thus, real scanning time of the code scanner is shorter than the constant scanning period, thereby increasing the scanning speed of the code scanner.

Moreover, after the present code scanner reads out data information of the code, there is no need for the code scanner to scan the code again but sequentially scans a next code. Thus, the code scanner can effectively scan the code, accordingly increasing the service life thereof.

In addition, as to the code relatively hard to be scanned, relatively longer scanning time is predetermined such that the scanning will be stopped if the data information still cannot be read out when the scanning time exceeds the predetermined time, thereby to ensure the scanning stability of the code scanner.

Other and further objectives of the invention will be apparent from the following drawings and description of preferred embodiments of the invention.

BRIEF DESCRIPTION OF THE DRAWINGS

Many aspects of the present code scanning device and code scanning method can be better understood with reference to the following drawings. The components in the drawings are not necessarily drawn to scale, the emphasis instead being placed upon clearly illustrating the principles of the present code scanning device and code scanning method.

DESCRIPTION OF THE PREFERRED EMBODIMENTS

Reference will now be made to the figures to describe the present invention in detail.

Figure 4:
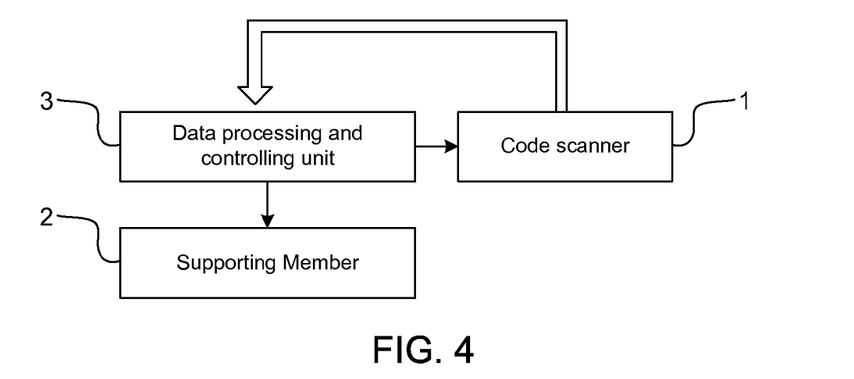
FIG. 4 is a block diagram of a code scanning device in accordance with a preferred embodiment of the present invention.

Referring to FIG. 4, a code scanning device is shown, in accordance with a preferred embodiment of the present invention. The code scanning device includes a code scanner 1 configured for scanning codes of specimens, a supporting member 2 configured for supporting carriers (e.g., test-tubes) having the codes to be scanned, and a data processing and controlling unit 3. The data processing and controlling unit 3 is used for receiving data information of the codes transmitted from the code scanner 1, determining whether or not the data information is correct, controlling the code scanner to scan the codes or stop scanning of the code scanner 1, and controlling movement (e.g., rotation or translation) of the supporting member 2.

When the code scanner 1 successfully reads out data of the codes, the code scanner 1 transmits the data to the data processing and controlling unit 3. When the code scanner 1 fails to read out the codes during a second predetermined time, a failure signal of scanning is transmitted to the data processing and controlling unit 3. Then, the data processing and controlling unit 3 determines whether or not the data of the scanned codes is correct according to a code decision method, wherein if correct, the data processing and controlling unit 3 transmits a command of ending the scanning to the code scanner 1 such that the code scanner 1 ends scanning the codes, and meanwhile transmits a control command to the supporting member 2 for controlling the supporting member 2 to move so that a next code to be scanned is shifted to the scanning position, thereby beginning a next scanning process; and if not correct, the code scanner 1 keeps scanning the codes until the second predetermined time is over.

When the scanning time exceeds the second predetermined time and the data processing and controlling unit 3 fails to receive correct data information of the codes transmitted from the code scanner 1, it is determined that the code scanner 1 cannot successfully scan the current code. Thus, the data processing and controlling unit 3 controls the code scanner 1 to stop scanning the current code and controls the supporting member 2 to move so that a next code to be scanned is shifted to the scanning position. Accordingly, the code scanning device completes the current scanning process and is ready for next.

When the data processing and controlling unit 3 fails to receive correct data information of the currently scanned code or the failure signal of scanning transmitted from the code scanner 1, the data processing and controlling unit 3 stop the scanning operation of the code scanner 1 and the movement of the supporting member 2.

Figure 5:
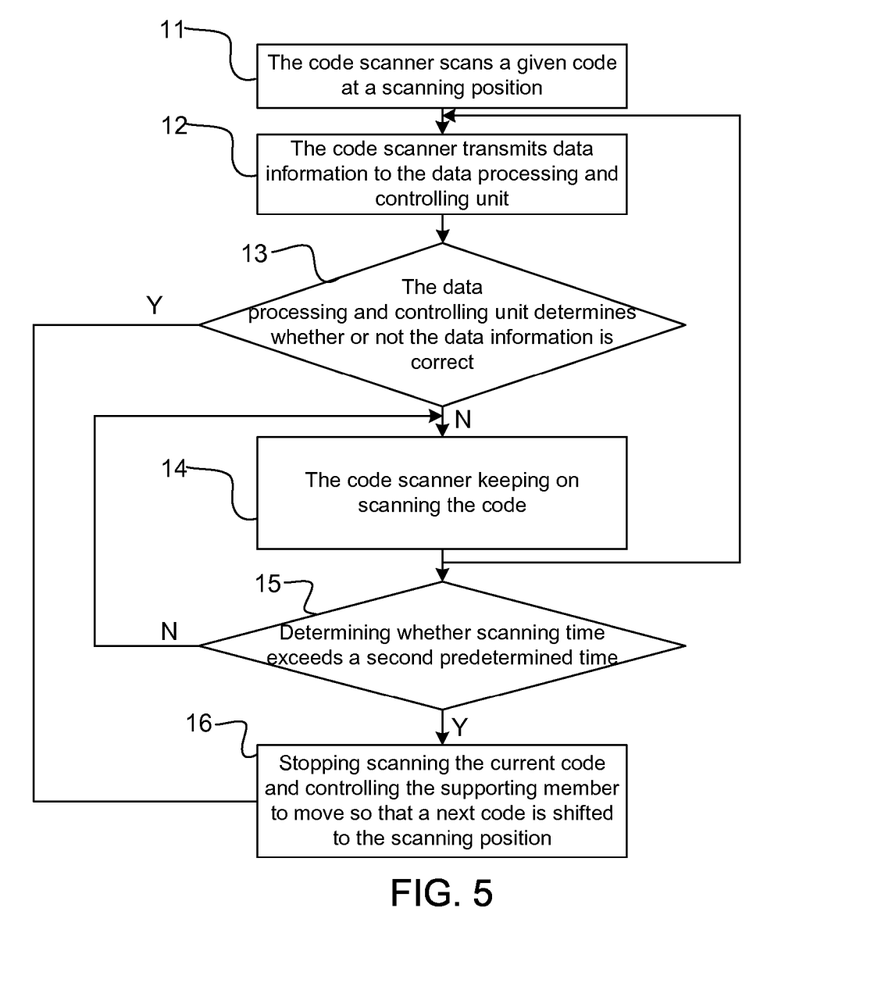
FIG. 5 is a flow chart of a code scanning method using the code scanning device shown in FIG. 4.

FIG. 5 illustrates a flow chart of a code scanning method using the device described thereinbefore. The code scanning method includes the following steps. In step 11, the data processing and controlling unit 3 controls the code scanner 1 to scan a given code, which is driven to a scanning position. In step 12, the code scanner 1 completes scanning of the given code and transmits data information of the code to the data processing and controlling unit 3. In step 13, the data processing and controlling unit 3 determines whether or not the data information is correct, wherein if correct, step 16 step 14, the data processing and controlling unit 3 controls the code scanner 1 to keep on scanning the given code, followed by steps 12 and 13. In step 15 follows a repeat of the steps 12, 13 and 14, in which the data processing and controlling unit 3 determines whether or not the total scanning time (i.e., time spent in steps 11, 12, 13, 14, 12, 13 and 14) exceeds the second predetermined time, wherein if not, the code scanner 1 goes on the scanning operation, and if yes, the code scanning device performs step 16 for keeping continuously scanning the codes. In step 16, the data processing and controlling unit 3 stops the scanning operation of the code scanner 1 and controls the supporting member 2 to move so that a next code to be scanned is shifted to the scanning position.

Figure 6:
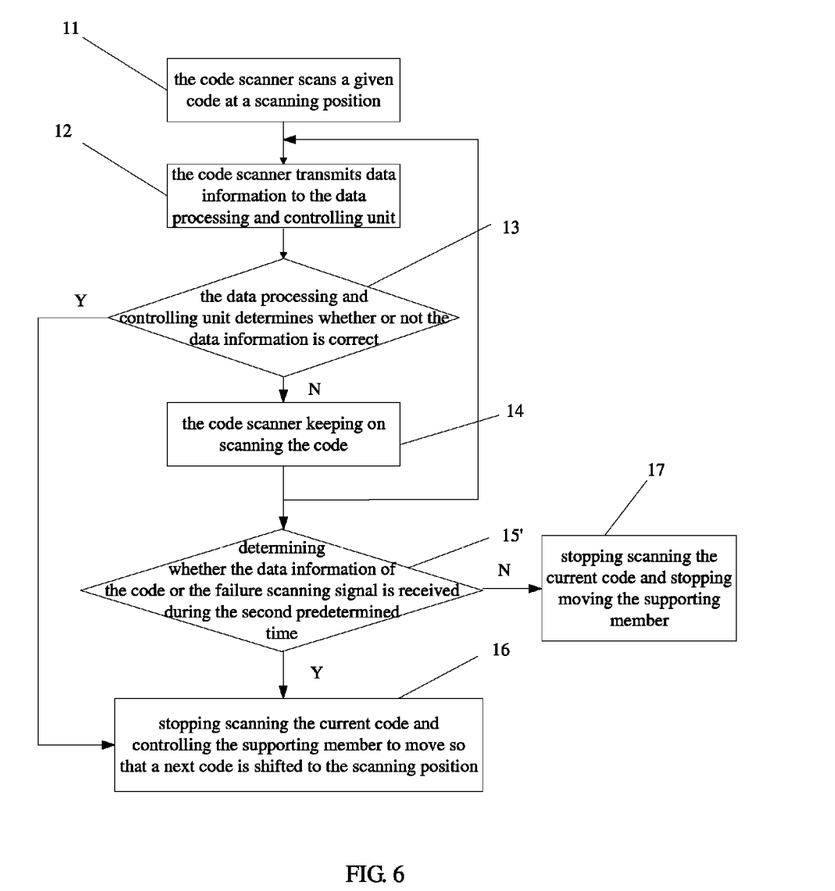
FIG. 6 is a flow chart of an improved code scanning method on the basis of the method shown in FIG. 5.

FIG. 6 illustrates an improved scanning method on the basis of the method described thereinbefore. The improved scanning method is essentially similar to the scanning method as shown in FIG. 5, except step 15' and step 17. In step 15', the data processing and controlling unit 3 determines whether or not correct data information of the code or the failure signal of scanning transmitted from the code scanner 1 is received during the second predetermined time: if yes, the step 16 follows; and if not, the step 17 follows. In step 17, the data processing and controlling unit 3 stops the scanning operation of the code scanner 1 and the movement of the supporting member 2. In this circumstance, it can be effectively detected whether or not the code scanner 1 is out of work.

Figure 7:
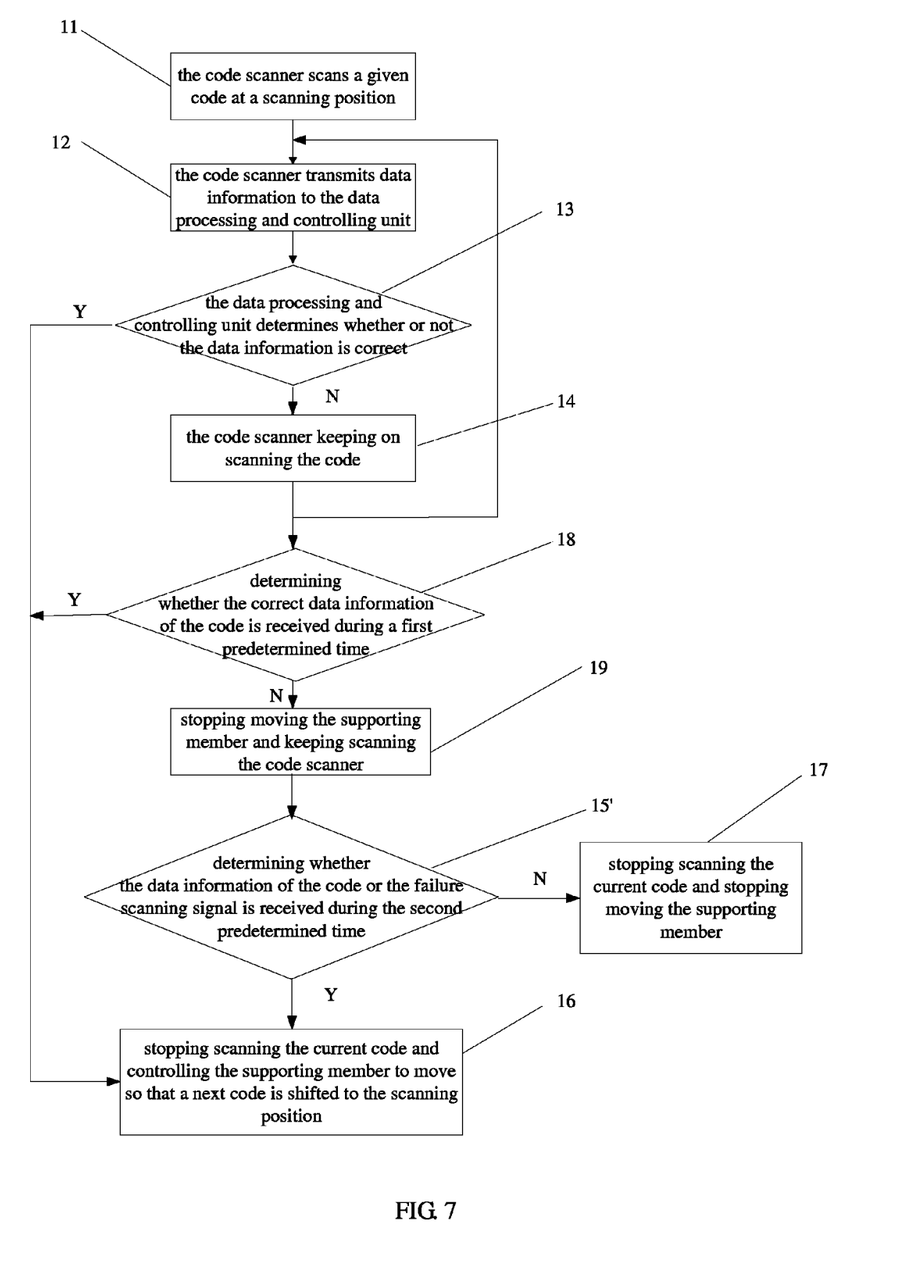
FIG. 7 is a flow chart of an alternative code scanning method using the code scanning device shown in FIG. 4.

FIG. 7 illustrates a flow chart of a static and dynamic scanning combined method. This static and dynamic scanning combined method is essentially similar to the scanning method as shown in FIG. 5, except after step 14. After step 14, the data processing and controlling unit 3 determines whether or not correct data information of the code is received during a first predetermined scanning time. The first predetermined scanning time is a running period of the code scanner 1 before stopping movement of the supporting member 2. If the data processing and controlling unit 3 receives the correct data information during the first predetermined scanning time, then going to step 16, and if not, going to step 19.

In step 19, the data processing and controlling unit 3 stops movement of the supporting member 2 and controls the code scanner 1 to keep on scanning. As such, the code scanning device transfers the model from dynamic scanning to static scanning, and then going to step 15'. The first predetermined scanning time is shorter than the second predetermined scanning time.

Figure 8:
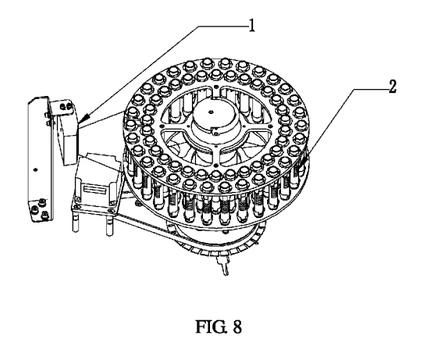
FIG. 8 is an isometric, structural, and schematic view of the code scanning device shown in FIG. 4 and of codes to be scanned.

Referring to FIG. 8, the code scanner 1 is adjacent to the supporting member 2, for scanning codes supported thereon. In the illustrated embodiment, the supporting member 2 is a specimen/reagent table typically utilized in the biochemical analyzer (not shown). A plurality of test-tubes are circularly mounted on the supporting member 2. Each test-tube labeled with a code corresponding to the specimen loaded therein is configured for loading a respective specimen therein, and each code represents the ID of each respective specimen. The code scanner 1 reads the code, and thus the ID number of the respective specimen is obtained. Then, the biochemical analyzer is in communication with a lab information system (hereinafter LIS) via an interface interconnection based on the ID number. Accordingly, the biochemical analyzer searches information of the respective specimen stored in the LIS. The information of the specimen includes, e.g., name, age, ethnic, testing items, and specimen type of a patient. As such, information of the specimen is automatically input into the biochemical analyzer.

It is to be understood that the static scanning model, the dynamic scanning model, and the combination thereof can be applied in the present code scanning method.

Figure 9:
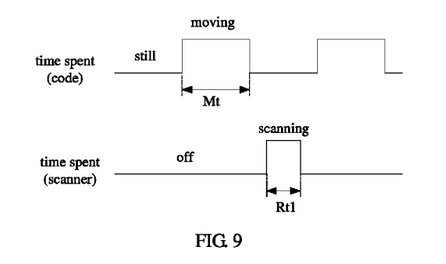
FIG. 9 is a time schedule graph of the code scanning method using a static scanning model.

FIG. 9 illustrates a scanning time schedule of a static scanning model using a dynamic scanning period. The test-tube in the supporting member 2 (i.e., the specimen/reagent table) takes moving time Mt to move from a waiting position to a scanning position. When a given code labeled on a test-tube is driven to the scanning position, the data processing and controlling unit 3 transmits an action command to the code scanner 1. The code scanner 1 then scans the given code. For certain time Rt1, the code scanner 1 reads out the given code and transmits data information of the given code to the data processing and controlling unit 3.

When the data processing and controlling unit 3 determines that the data information is correct, the data processing and immediately controlling unit 3 transmits a command of ending the scanning to the code scanner 1 so as to stop scanning of the code scanner. The specimen/reagent table is simultaneously controlled to rotate so that a next given code is shifted to the scanning position, thereby being ready for a next scanning process.

Figure 10:
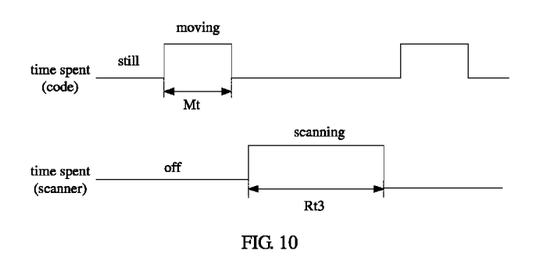
FIG. 10 is another time schedule graph of the code scanning method using the static scanning model.

When the data processing and controlling unit 3 receives incorrect data information of the given code, or fails to receive data information of the given code transmitted from the code scanner 1, the code scanner keeps on scanning the given code, as shown in FIG. 10. When scanning time of the code scanner 1 exceeds maximal time, e.g., the second predetermined time Rt3, and the data processing and controlling unit 3 fails to receive correct data information of the given code transmitted from the code scanner 1, the data processing and controlling unit 3 determines that the given code labeled on the test-tubes is unable to be read out or that no code is labeled on the test-tube. Accordingly, the data processing and controlling unit 3 finishes the period of scanning the current code, transmits an end command to the code scanner 1, and controls the specimen/reagent table to rotate so that a next test-tube with another given code is shifted to the scanning position, thereby being ready for a next scanning process.

Figure 11:
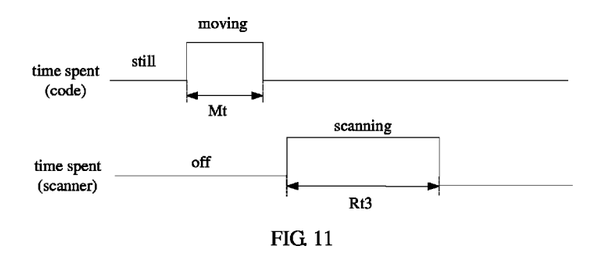
FIG. 11 is yet another time schedule graph of the code scanning method using the static scanning model.

When scanning time of the code scanner 1 exceeds the second predetermined time Rt3, as shown in FIG. 1, and the data processing and controlling unit 3 fails to receive data information of the given code or the failure signal of scanning transmitted from the code scanner 1, the data processing and controlling unit 3 determines that the code scanner 1 is out of work, thereby stopping the scanning of the code scanner 1 and the movement of the supporting member 2.

Figure 12:
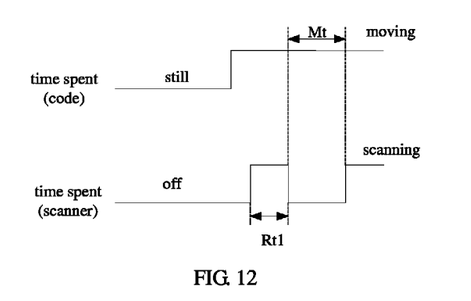
FIG. 12 is a time schedule graph of the code scanning method using a dynamic scanning model.

FIG. 12 illustrates a scanning time schedule of a dynamic scanning method using a dynamic scanning period. During scanning, each test-tube in the supporting member 2 takes moving time Mt to move from a waiting position to a scanning position. When a given code labeled on a test-tube is driven to the scanning position, the data processing and controlling unit 3 transmits an action command to the code scanner 1. The code scanner 1 then scans the given code. For the certain time Rt1, the code scanner 1 reads out the given code and transmits data information of the given code to the data processing and controlling unit 3.

When the data processing and controlling unit 3 determines that the data information is correct, the data processing and controlling unit 3 transmits a command of ending the scanning to the code scanner 1 immediately so as to stop the scanning of the code scanner 1. The specimen/reagent table is simultaneously controlled to rotate so that a next test-tube with another given code is shifted to the scanning position, thereby being ready for a next scanning process.

Figure 13:
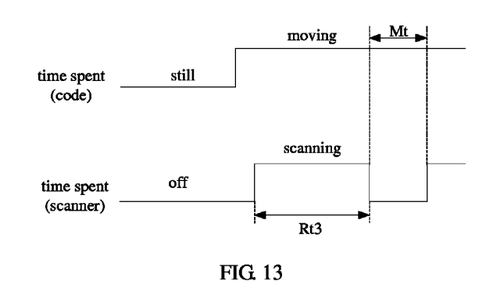
FIG. 13 is another time schedule graph of the code scanning method using the dynamic scanning model.

When the data processing and controlling unit 3 receives incorrect data information of the given code, or fails to receive any information of the given code transmitted from the code scanner 1, the code scanning keeps on scanning, as shown in FIG. 13. When scanning time of the code scanner 1 exceeds maximal time, e.g., the second predetermined time Rt3, and the data processing and controlling unit 3 fails to receive correct data information of the given code transmitted from the code scanner 1, the data processing and controlling unit 3 determines that the given code labeled on the test-tube is unable to be read out or that no code is labeled on the test-tube. Accordingly, the data processing and controlling unit 3 finishes the period of scanning the current code, transmits an end command to the code scanner 1, and controls the specimen/reagent table to rotate so that a next test-tube with another given code is shifted to the scanning position, thereby being ready for a next scanning process.

Figure 14:
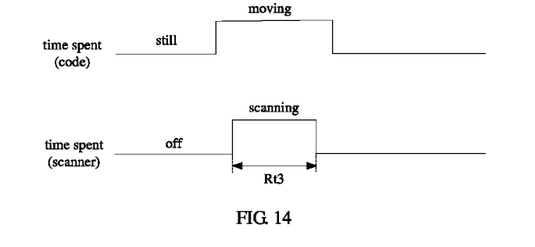
FIG. 14 is yet another time schedule graph of the code scanning method using the dynamic scanning model.

When the scanning time of the code scanner 1 exceeds the second predetermined time Rt3, as shown in FIG. 14, and the data processing and controlling unit 3 fails to receive any data information of the given code or the failure signal of scanning transmitted from the code scanner 1, the data processing and controlling unit 3 determines that the code scanner 1 is out of work, thereby stopping the scanning of the code scanner 1 and the movement of the supporting member 2.

Figure 15:
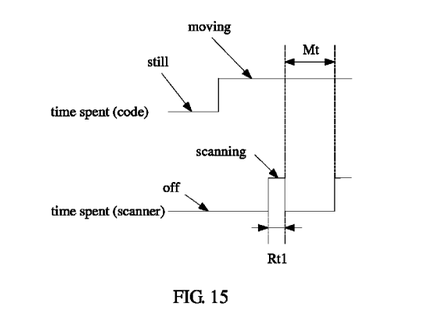
FIG. 15 is a time schedule graph of the code scanning method using a dynamic and static scanning combined model.

FIG. 15 illustrates a scanning time schedule of a static and dynamic scanning combined model using a dynamic scanning period. At the beginning of scanning the given code, the specimen/reagent table begins to move. During scanning, each test-tube in the supporting member 2 takes the moving time Mt to move from a waiting position to a scanning position. When a given code labeled on a test-tube is driven to the scanning position, the data processing and controlling unit 3 transmits an action command to the code scanner 1. The code scanner 1 then scans the given code. For a certain time Rt1, the code scanner 1 reads out the given code and transmits data information of the given code to the data processing and controlling unit 3. The time Rt1 is shorter that the first predetermined time Rt2 (see FIG. 16).

When the data processing and controlling unit 3 determines that the data information is correct, the data processing and immediately controlling unit 3 transmits a command of ending scanning to the code scanner 1 so as to stop scanning operation of the code scanner 1. The specimen/reagent table is simultaneously controlled to rotate so that a next test-tube with another given code shifted to the scanning position, thereby being ready for a next scanning process.

Figure 16:
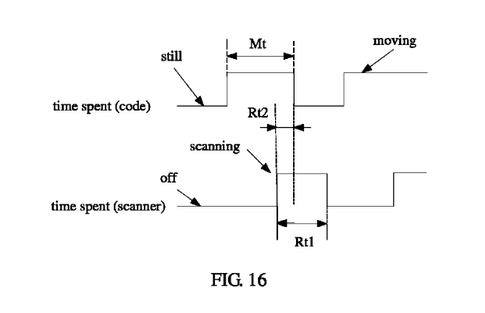
FIG. 16 is another time schedule graph of the code scanning method using the dynamic and static scanning combined model.

When the code scanner scans the given code for certain time longer than the first predetermined time Rt2, i.e. the time Rt1 is longer that the first predetermined time Rt2, as shown in FIG. 16, and meanwhile the data processing and controlling unit 3 fails to receive data information of the given code, the data processing and controlling unit 3 stops movement of the specimen/reagent table, and the code scanner 1 scans the still given code.

When the time Rt1 is shorter that the second predetermined time Rt3 and the code scanner 1 successfully reads out data information of the given code, the code scanner 1 transmits the data information to the data processing and controlling unit 3. When the data processing and controlling unit 3 determines that the data information is correct, the data processing and controlling unit 3 immediately transmits a command of ending the scanning to the code scanner 1 so as to stop scanning of the code scanner 1. The specimen/reagent table is simultaneously controlled to rotate so that a next test-tube with another given code is shifted to the scanning position, thereby being ready for a next scanning process.

Figure 17:
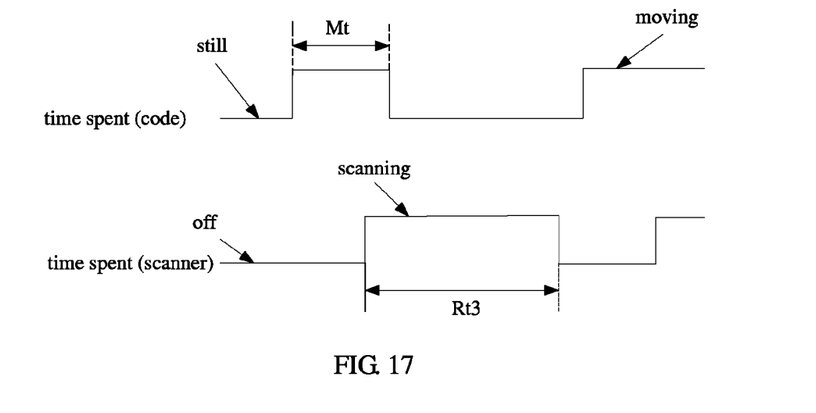
FIG. 17 is yet another time schedule graph of the code scanning method using the dynamic and static scanning combined model.

When the data processing and controlling unit 3 receives incorrect data information of the given code, or fails to receive information of the given code transmitted from the code scanner 1, the code scanning keeps on scanning the given code, as shown in FIG. 17. When scanning time of the code scanner 1 exceeds maximal scanning time, e.g., the second predetermined time Rt3, and the data processing and controlling unit 3 fails to receive correct data information of the given code transmitted from the code scanner 1, the data processing and controlling unit 3 determines that the given code labeled on the test-tube is unable to be read out or that no code is labeled on the test-tube. Accordingly, the data processing and controlling unit 3 finishes the period of scanning the current code, transmits an end command to the code scanner 1, and controls the specimen/reagent table to rotate so that a next test-tube with another given code is shifted to the scanning position, thereby being ready for a next scanning process.

Figure 18:
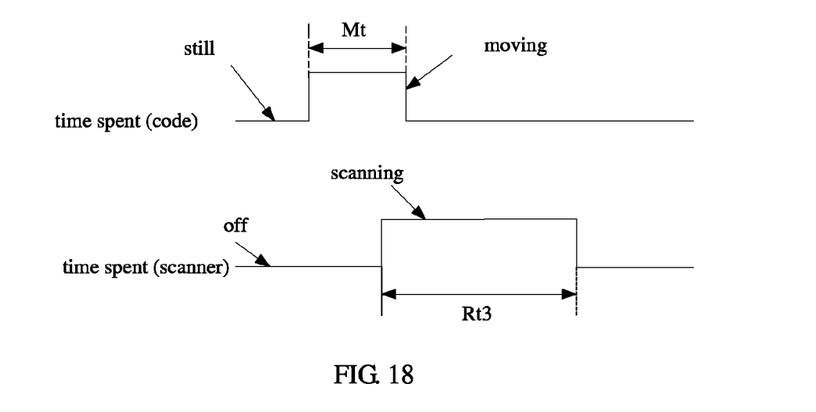
FIG. 18 is still another time schedule graph of the code scanning method using the dynamic and static scanning combined model.

When the scanning time of the code scanner 1 exceeds the second predetermined time Rt3, as shown in FIG. 18, and the data processing and controlling unit 3 fails to receive any data information of the given code or the failure signal of scanning transmitted from the code scanner 1, the data processing and controlling unit 3 determines that the code scanner 1 is out of work, thereby stopping the scanning of the code scanner 1 and the movement of the supporting member 2.

Various preferred embodiments have been described with reference to the accompanying figures. However, it will be apparent to those skilled in the art that various modifications and variations may be made in the method and system of the present invention without departing from the spirit or scope of the invention. For example, the supporting member 2 (i.e., the specimen/reagent table) could be relatively stationary and the code scanner 1 could move (e.g., rotate or translate) relative to the supporting member 2. Thus, the data processing and controlling unit 3 controls the movement of the code scanner 1. Therefore, it is intended that the present invention includes modifications and variations that are within the scope of the appended claims and their equivalents.

What is claimed is:

1. A code scanning device, comprising:
    a code scanner configured for scanning a code on a carrier when the carrier is in a scanning position relative to the code scanner;
    a supporting member extending in a vertical direction configured for supporting a plurality of carriers circularly mounted around the supporting member, each carrier having a respective code and configured to hold a specimen or reagent; and
    a data processing and controlling unit configured for receiving data information of a scanned code from the code scanner and determining whether the data information of the scanned code is correct,
    wherein when the data information of a selected code on a selected one of the plurality of carriers is determined to be correct, the data processing and controlling unit controls the supporting member to move a next one of the plurality of carriers into the scanning position,
    and when the data information of the selected code is determined to be incorrect, the data processing and controlling unit controls the code scanner repeatedly scans the selected code and determines whether data information of the selected code is correct, wherein the code scanner repeatedly scans the selected code until the first of: the selected code is determined to be correct and a predetermined maximum time is exceeded.

2. The code scanning device as claimed in claim 1,
    wherein the data processing and controlling unit is further configured for controlling the code scanner to scan the selected code when the supporting member is moving, wherein the data processing and controlling unit is configured for controlling the supporting member to stop moving when data information of the selected code that is determined to be correct is not received within a predetermined moving scan time, and wherein the predetermined moving scan time is shorter than the predetermined maximal time.

3. The code scanning device as claimed in claim 1, wherein when the code scanner fails to read out data information of the selected code that is determined to be correct in a predetermined maximal time, the code scanner transmits a failure signal to the data processing and controlling unit.

4. The code scanning device as claimed in claim 3, wherein the data processing and controlling unit is configured for stopping scanning of the code scanner and movement of the supporting member when the data information of the selected code that is determined to be correct is not received within the predetermined maximal time.

5. The code scanning device as claimed in claim 1, wherein the code scanner scans the selected code when the selected carrier is still.

6. The code scanning device as claimed in claim 1, wherein the code scanner scans the selected code when the selected carrier is moving.

7. A code scanning method, comprising:
controlling a code scanner to scan data information of a selected code on a selected one of a plurality of specimen or reagent carriers on a supporting member extending in a vertical direction and circularly mounted or mounted in an orbit, the supporting member configured to position the selected carrier relative to the code scanner in a scanning position of the code scanner;
determining whether data information of the selected code received from the code scanner is correct;
when the data information of the selected code is determined to be correct, controlling the supporting member to position a next one of the plurality of carriers in the scanning position; and
when the data information of the selected code is determined to be incorrect or is not received, controlling the code scanner repeatedly scans the selected code and determines whether data information of the selected code is correct, wherein the code scanner repeatedly scans the selected code until the first of: the selected code is determined to be correct and a predetermined maximum time is exceeded.

8. The code scanning method as claimed in claim 7, further comprising: transmitting a failure signal when the code scanner fails to read out data information of the selected code that is determined to be correct within a predetermined maximal time.

9. The code scanning method as claimed in claim 8, further comprising when data information of the selected code that is determined to be correct is not received within the predetermined maximal time, causing the supporting member to position a next one of the plurality of carriers in the scanning position.

10. The code scanning method as claimed in claim 7, wherein the code scanner scans the selected code when the selected carrier is still.

11. The code scanning method as claimed in claim 7, wherein the code scanner scans the selected code when the selected carrier is moving.

12. The code scanning method as claimed in claim 7, wherein the selected code is scanned while the supporting member is moving the selected carrier, the method further comprising, when the data information of the selected code is not determined to be correct within a predetermined moving scan time, stopping movement of the supporting member, wherein the predetermined moving scan time is shorter than a predetermined maximal time.

13. A code scanning device, comprising:
a code scanner configured for scanning a code on a carrier when the carrier is in a scanning position relative to the code scanner;
a supporting member extending vertically and configured for supporting a plurality of specimen or reagent carriers, each carrier having a respective code; and
a data processing and controlling unit configured for receiving data information of a scanned code from the code scanner and determining whether the data information of the scanned code is correct,
wherein when data information of a selected code on a selected one of the plurality of carriers is determined to be correct, the data processing and controlling unit controls the code scanner to move to position a next one of the plurality of carriers in the scanning position, and
wherein when the data information of the selected code on the selected carrier is determined to be incorrect, the data processing and controlling the code scanner repeatedly scans the selected code and determines whether data information of the selected code is correct, wherein the code scanner repeatedly scans the selected code until the first of: the selected code is determined to be correct and a predetermined maximum time is exceeded.

14. The code scanning device as claimed in claim 13, wherein the data processing and controlling unit is further configured for controlling the code scanner to scan the selected code when the code scanner is moving relative to the selected carrier, wherein the data processing and controlling unit is configured to stop the code scanner moving so that the code scanner statically scans the selected code when data information of the selected code that is determined to be correct is not received within a predetermined moving scan time, and wherein the predetermined moving scan time is shorter than the predetermined maximal time.

15. The code scanning device as claimed in claim 13, wherein when the code scanner fails to read out data information of the selected code that is determined to be correct within a predetermined maximal time, the code scanner transmits a failure signal to the data processing and controlling unit.

16. The code scanning device as claimed in claim 15, wherein the data processing and controlling unit is configured for stopping scanning and movement of the code scanner when the data information of the selected code that is determined to be correct is not received within the predetermined maximal time.

17. The code scanning device as claimed in claim 13, wherein the code scanner scans the selected code when the code scanner is still relative to the selected carrier.

18. The code scanning device as claimed in claim 13, wherein the code scanner scans the selected code when the code scanner is moving relative to the selected carrier.

* * * * *